United States Patent [19]

Narayan et al.

[11] Patent Number: 4,677,154
[45] Date of Patent: Jun. 30, 1987

[54] STABILIZER PACKAGE FOR POLYURETHANE COMPRISING A SUBSTITUTED CRESOL AND ANOTHER COSTABILIZER

[75] Inventors: Thirumurti Narayan, Grosse Ile; Peter T. Kan, Plymouth, both of Mich.

[73] Assignee: BASF Corporation, Wyandotte, Mich.

[21] Appl. No.: 810,238

[22] Filed: Dec. 18, 1985

[51] Int. Cl.$^4$ .............................................. C08L 75/04
[52] U.S. Cl. ..................................... 524/710; 252/182; 524/719; 524/720; 524/721; 560/331; 560/332; 560/333
[58] Field of Search ............... 524/710, 719, 720, 721; 560/331, 332, 333; 252/182

[56] References Cited

U.S. PATENT DOCUMENTS

| | | | |
|---|---|---|---|
| 2,957,903 | 10/1960 | Spiegler | 260/453 SP |
| 3,715,381 | 2/1973 | Spaunburgh et al. | 528/72 |
| 4,065,362 | 12/1977 | Kataoka et al. | 203/58 |
| 4,297,472 | 10/1981 | Heiss | 528/48 |

OTHER PUBLICATIONS

Cooper et al, U.S. Defensive Publication No. T856,006, published Nov. 5, 1968, filed Nov. 15, 1966, 8560G4.

*Primary Examiner*—Maurice J. Welsh
*Attorney, Agent, or Firm*—John C. Demeter; Joseph D. Michaels

[57] ABSTRACT

The invention relates to elimination of discoloration in polyurethanes, particularly thermoplastic polyurethanes, by the addition to the reaction mixture from 0.01 to 1 percent by weight, based on the isocyanate component, a stabilizer package characterized as BHT and a compound selected from tris(nonylphenyl) phosphite, tetrakis(2,4-di-t-butylphenyl)-4,4'-biphenylene diphosphonite, bis(2,4-di-t-butylphenyl)pentaerythritol diphosphite, 2,2'-oxamido-bis[ethyl-3(3,5-dit-butyl-4-hydroxyphenyl)]propionate, disteryl thiodipropionate, triisodecyl phosphite, trilauryl trithiophosphite, distearyl pentaerythritol, 2,2'-ethylene bis(4,6-di-tertiarylbutylphenol), octadecyl 3-(3',5'-di-t-butyl-4'-hydroxy phenyl) propionate, 4,4'-thio-bis(2-t-butyl-5-methylphenol), 4,4'-thio-bis(2-t-butyl-5-methylphenol), 2,2'-methylene-bis-(4-methyl-6-t-butylphenol), tris (3,5-di-t-butyl-4-hydroxybenzyl) isocyanurate, phenothiazine, tris(2,4-di-t-butylphenyl) phosphite, 4,4'-methylene bis(2,6-di-t-butylphenol), 2,6-di-t-butyldimethylaminomethylphenol and blends thereof.

9 Claims, No Drawings

STABILIZER PACKAGE FOR POLYURETHANE COMPRISING A SUBSTITUTED CRESOL AND ANOTHER COSTABILIZER

BACKGROUND OF THE INVENTION

Polyurethanes which are prepared by reacting a polyol with a polyisocyanate discolor when cured at elevated temperatures. This is caused by impurities in the polyisocyanate which are not easily separable by distillation.

Recently, there has developed a market for colorless products made of polyurethane. However, methods to provide such a product to the marketplace have resulted in changes in physical properties of the product. This has limited the use of colorless polyurethanes to products having lower mechanical property requirements, for example, compression and strength characteristics for a chair cushion versus a windsurfer board.

Prior art methods to stabilize the color of polyurethanes have been developed. The approach of these methods is either purification or stabilization of the polyisocyanate. For example, U.S. Pat. No. 4,297,472 teaches adding a small amount of vicinal diols to the formulation to improve the color stability of the polyurethanes. U.S. Pat. No. 4,065,362 teaches a process to purify the organic isocyanate, U.S. Pat. No. 3,715,381 teaches incorporating 2,4-di(t-butyl)-p-cresol (BHT) in the formulation, and U.S. Pat. No. 2,957,903 teaches incorporating an amount of triarylphosphite in a polyisocyanate. However, discoloration of the final product still occurs. Reasons for the discoloration include impurities in the starting materials, temperature effects and the processing procedure itself, as well as breakdown of the product by light and/or temperature effects over a period of time. This problem is most pronounced in thermoplastic polyurethanes prepared from aromatic isocyanates, for example, methylene diphenyl diisocyanate (MDI).

This invention solves this problem by incorporating an additive composition designed specifically to stabilize the formulation and thus the color of the final product.

DESCRIPTION OF THE INVENTION

It has now been found that the discoloration problem cited above can be substantially eliminated by adding to a thermoplastic polyurethane reaction mixture from 0.01 to 1 percent by weight, based on the isocyanate component, a stabilizer package. As used herein, "stabilizer package" is an additive composition characterized as BHT and a compound selected from the group consisting of triphenyl phosphite, tris(nonylphenyl) phosphite, tetrakis(2,4-di-t-butylphenyl)-4,4'-biphenylene diphosphonite, bis(2,4-di-t-butylphenyl)pentaerythritol diphosphite, distearyl thiodipropionate, triisodecyl phosphite, trilauryl trithiophosphite, distearyl pentaerythritol, 2,2'-ethylene bis(4,6-di-tertiarylbutylphenol), octadecyl 3-(3', 5'-di-t-butyl-4'-hydroxyphenyl) propionate, 4,4'-thio-bis(2-t-butyl-5-methylphenol), 4,4'-thio-bis(2-t-butyl-5-methylphenol), 2,2'-methylene-bis-(4-methyl-6-tbutylphenol), tris (3,5-di-t-butyl-4-hydroxybenzyl) isocyanurate, phenothiazine, tris(2,4-di-t-butylphenyl) phosphite, 4,4'-methylene bis(2,6-di-t-butylphenol), 2,6-di-t-butyldimethyl-aminomethylphenol and blends thereof.

The instant invention is directed to a process of producing a thermoplastic polyurethane wherein a stablizer additive package, in small amounts, is added to the polyurethane reaction mixture either separately or along with other components. The thermoplastic polyurethane formulation comprises an aliphatic, cycloaliphatic, arylaliphatic or aromatic polyisocyanate, a polyol selected from the group consisting of polyester polyols and polyoxyalkylene polyether polyols, and a short chain extender. More particularly, the polyisocyanate is pure methylene diphenyl diisocyanate (MDI). The stabilizer package is added in an amount ranging from 0.01 to 1.0 percent by weight based upon the isocyanate component.

The instant invention, thus, may be characterized as a method of improving the color stability of thermoplastic polyurethanes prepared from a reaction mixture comprising:
  (1) 4,4'-methylene diphenyl diisocyanate optionally containing small amounts of impurities,
  (2) a polyol selected from the group consisting of polyester polyols and polyoxyalkylene polyether polyols,
  (3) a short chain extender, and
  (4) from 0.01 to 1.0 percent of a stabilizer additive package based on the isocyanate component, said stabilizer package characterized as;
2,6-di(t-butyl)-p-cresol (BHT) and a compound selected from the group consisting of tris(nonylphenyl) phosphite, tetrakis(2,4-di-t-butylphenyl)4,4'-biphenylene diphosphonite, bis(2,4-di-t-butylphenyl)pentaerythritol diphosphite, distearyl thiodipropionate, triisodecyl phosphite, trilauryl trithiophosphite, distearyl pentaerythritol, 2,2'-ethylene bis(4,6-t-butyl-4'-hydroxy phenyl) propionate, 4,4'-thio-bis(2-t-butyl-5-methylphenol), 4,4'-thio-bis(2-t-butyl-5-methylphenol), 2,2'-methylene-bis-(4-methyl-6-t-butylphenol), tris (3,5-di-t-butyl-4hydroxybenzyl) isocyanurate, phenothiazine, tris(2,4-di-t-butylphenyl) phosphite, 4,4'-methylene bis(2,6-di-t-butylphenol), 2,6-di-t -butyldimethyl-aminomethylphenol and blends thereof.

In practicing the process in accordance with the invention, the stabilizer package can be dissolved in the polyol, a chain extender or mixtures thereof, or it may be added as a separate stream to the reaction mixture. The particular method of addition is not critical other than the fact that it must be present during the polymerization reaction.

In the process, in accordance with the invention, polyurethanes prepared from aliphatic, cycloaliphatic, arylaliphatic and aromatic isocyanates containing small amounts of impurities can be used. Representative of these types are the diisocyanates such as m-phenylene diisocyanate, 2,4-toluene diisocyanate, 2,6-toluene diisocyanate, mixtures of 2,4- and 2,6-toluene diisocyanate, hexamehtylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyl- diphenylmethane-4,4'-diisocyanate; the triisocyanates such as 4,4',4"-triphenylmethane triisocyanate, and toluene 2,4,6-triisocYanate; and the tetraisocyanate such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanates.

Representative polyols which may be employed in the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one —SH group and one —OH group as well as those which contain an amino group and an —SH group may be used. Generally, equivalent weight of the polyols will vary from 100 to 10,000, preferably from 1000 to 3000.

Any suitable hydroxy-terminated polyester may be used such are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, αβ-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxylcontaining polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any othe suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

In the preparation of a polyurethane in accordance with this invention, any of the polyols may be reacted with any of the isocyanates set forth and a chain extending agent. Chain extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines such as phenylene diamine, 1,4-cyclohexane-bis-(methylamine), ethylenediamine, diethylenetriamine, N-(2-hydroxylpropyl)ethylenediamine, N,N'-di(2-hydroxylpropyl)ethylenediamine, piperazine and 2-methylpiperazine.

The following examples illustrate the present invention. All parts are by weight unless otherwise indicated.

EXAMPLES 1-17

Fifty parts of a polyester diol based on adipic acid and 1,4-butanediol was placed in an appropriate vessel and blended with 10.25 parts of 1,4-butanediol. The temperature was held at 70° C. for about 30 seconds, then 35 parts MDI was added. When the reaction temperature reached 95° C., the composition was poured onto a disc shaped heated mold at a surface temperature of 125° C. The resultant thermoplastic polyurethane discs were removed six minutes after the beginning of the mixing process and post cured at 100° to 110° C. for 15 hours. The color of the thermoplastic polyurethane discs was then noted and described.

Control samples were made using MDI which contained 25 to 150 ppm color producing impurity. With the addition of the stabilizer package of this invention, the polyurethane discs produced were whiter. The results of the test were as set forth in Table I. Examples 1-9 represent comparative tests wherein the amounts of impurity in the MDI and the amounts and types of additives incorporated in the stabilizer package were varied.

As can be readily seen from Table I, with the addition of the subject invention additive stabilizer package, the disc color is white. It should be noted that color slightly improves with the addition of an additive or BHT alone, however, drastic improvement to a colorless polyurethane results only with the addition of the total stabilizer package of the subject invention. That is, BHT plus a compound selected from the group consisting of tris(nonylphenyl) phosphite, tetrakis(2,4-di-t-butylphenyl)4,4'-biphenylene diphosphonite, bis(2,4-di-t-butylphenyl)pentaerythritol diphosphite, 2,2'-oxamido-bis-[ethylene-3-(3,5-di-t-butly-4-hydroxyphenyl)propionate], distearyl thiodipropionate, triisodecyl phosphite, trilauryl trithiophosphite, distearyl pentaerythritol, 2,2'-ethylene bis(4,6-ditertiarylbutylphenol), octadecyl 3-(3',5'-di-t-butyl-4'hydroxy phenyl) propionate, 4,4'-thio-bis(2-t-butyl-5methylphenol), 4,4'-thio-bis(2-t-butyl-5-methylphenol), 2,2'-methylene-bis-(4-methyl-6-t-butylphenol), tris (3,5-di- t-butyl-4-hydroxybenzyl) isocyanurate, phenothiazine, tris(2,4-di-t-butylphenyl) phosphite, 4,4'-methylene bis(2,6-di-t-butylphenol), 2,6-di-t-butyldimethyl-aminomethyl-phenol and blends thereof.

TABLE I

| Example | Impurity in MDI, ppm | BHT, ppm | Stabilizers[a] (ppm) | Color of Discs |
|---|---|---|---|---|
| 1 | 130 | none | none | light brown |
| 2 | 130 | none | A (1000) | light tan |
| 3 | 130 | none | A (2000) | light tan |
| 4 | 130 | 300 | A (2000) | off white |
| 5 | 109 | 650 | none | pinkish light tan |
| 6 | 109 | 650 | A (1000) | white, lightly pinkish |
| 7 | 109 | 650 | A (2000) | white, better than above |
| 8 | 109 | 650 | A (5000) | white |
| 9 | 109 | 650 | B (1000) | white |
| 10 | 109 | 650 | B (2000) | white |
| 11 | 109 | 650 | C (2000) | as good as 7 |
| 12 | 109 | 650 | D (2000) | as good as 7 |
| 13 | 109 | 650 | E (1000) | as good as 7 |
| 14 | 109 | 650 | F (1000) | as good as 7 |
| 15 | 109 | 650 | G (1000) | as good as 7 |
| 16 | 30 | 2464 | A (1000) | pure white |
| 17 | 26 | 1000 | A (1000) | pure white |

[a]Additives Stabilizer
A = tris(nonylphenyl) phosphite
B = tetrokis(2,4-di-t-butylphenyl)-4,4'-biphenylene disphosphonite
C = bis(2,4-di-t-butylphenyl) pentaerythritol diphosphite
D = 2,2'-oxamido-bis-[ethylene-3-(3,5-di-t-butyl-4-hydroxyphenyl)propionate]
E = Dilauryl thiodipropionate
F = Distearyl thiodipropionate
G = Di(tridecyl) thiodipropionate

EXAMPLE 18-24

In this series, polyurethane discs were made with pure MDI containing unseparable impurities and spiked samples. The formulation used was:
(a) 25 parts polyester diol based on adipic acid and butanediol,
(b) 5.1 parts 1,4-butanediol,
(c) 17.5 parts pure MDI.

The discs were made and post cured at 100° C. for 15 hours. Thereafter, the "whiteness index" of the thermoplastic polyurethane discs were determined using Hunter lab equipment which measures the whiteness index of solid surfaces. The whiteness index is measured on the scale of 0 to 100 in which 0 is black and 100 is ultimate white. Results are shown in Table II.

TABLE II

| Example No. | Impurity in MDI, ppm | BHT, ppm Additive | Tris(nonylphenyl)phosphite ppm Additive | Triphenyl Phosphite, ppm Additive | Whiteness Index |
|---|---|---|---|---|---|
| 18 | 101 | 650 | — | — | 25.8 |
| 19 | 101 | 650 | 500 | — | 44.4 |
| 20 | 101 | 650 | 1000 | — | 49.5 |
| 21 | 101 | 650 | 2000 | — | 55.7 |
| 22 | 101 | 650 | — | 1000 | 55.4 |
| 23 | 32 | 650 | — | — | 52.2 |
| 24 | 32 | 650 | 500 | — | 60.2 |

This table illustrates the effectiveness of the subject invention stabilizer package. Holding the amount of impurity at a constant level (101 ppm) and increasing the amount of the stabilizer package increases the whiteness index indicating a progressively colorless polyurethane. Note that the complete stabilizer package of the invention is required to give the desired results. BHT used alone, Example 18, results in a polyurethane with a low whiteness index, that is a colored polyurethane. Examples 23 and 24 illustrate results obtained using MDI which contains a low impurity content (32 ppm). Example 24 incorporates the subject invention additive stabilizer package and Example 23 does not. In comparing the two examples, the whiteness index drastically increases from 52.2, for Example 23, to 60.2, for Example 24. This is a 15 percent improvement. Thus, it is readily apparent that the addition of the stabilizer package herein disclosed results in a colorless polyurethane far superior than that of conventional methods.

The embodiment of the invention in which an exclusive privilege or property is claimed are defined as follows:

1. A process for improving the color stability of polyurethane comprising conducting the polyurethane reaction in the presence of an additive stabilizer package comprising 2,6-di-(t-butyl)-p-cresol and a compound selected from the group consisting of tris(nonylphenyl) phosphite, tetrakis(2,4-di-ti-butylphenyl)-4,4'-biphenylene diphosphonite, bis(2,4-di-t-butylphenyl)pentaerythritol disphosphite, 2,2'-oxamido-bis- distearyl thiodipropionate, triisodecyl phosphite, trilauryl trithiophosphite, distearyl pentaerythritol, 2,2'-ethylene bis(4,6-di-tertiaryburylphenol), octadecyl 3-(3',5'-di-t-butyl4'-hydroxyphenyl) propionate, 4,4'-thio-bis(2-t-butyl-5-methylphenol), 4,4'-thio-bis(2-t-butyl-5-methylephenol), 2,2'- methylene-bis-(4-methyl-6-t-butylphenol), tris (3,5-di-tibutyl4-hydroxybenzyl) isocyanurate, phenothiazine, tris(2,4-di-tbutylphenyl) phosphite, 4,4'-methylene bis (2,6-di-t-butylphenol), 2,6-di-t-butyldimethyl-aminomethylphenol and blends thereof.

2. The process of claim 1, wherein said polyurethane is a thermoplastic product prepared from a substantially difunctional polyisocyanate.

3. The process of claim 1 wherein the polyurethane is a thermosetting product prepared from a substantially tri- and/or tetrafuncitional polyisocyanate.

4. The process of claim 1 wherein said stabilizer is employed in an amount from 0.01 to 1.0 percent based on the isocyanate component.

5. The process of claim 1 wherein said polyisocyanate is pure MDI.

6. A stabilized polyisocyanate comprising:
(a) an organic polyisocyanate, and
(b) a stabilizer package system comprising 2,6-di-(t-bityl)-p-creso and a compound selected from tris(-nonylphenyl)phosphite, tetrakis)2,4-di-t-butyl- phenyl)4,4'-biphneylene diphosphonite, bis(2,4-di-t-butylphenyl)pentaerythritol diphosphite, 2,2'-oxamido-bis- distearyl thiodipropionate, triisodecyl phosphiate, trialuryl trithiophosphite, distearyl pentaerythritol, 2,'-ethyelene bis(4,6-di-tertarybutylphenol), octadecyl 3-(3',5'-di-t-butyl-4'hydroxyphenyl)propionate, 4,4'-thio-bis(2-t- butyl-5-methylphenol), 4,4'-thio-bis(2-t-butyl-5methylphenol), 2,2'-methylene-bis-(4-methyl-6-tbutylphenol), tris (3,5-di-t-butyl-4-hydroxybenzyl) isocyanurate, phenothiazine, tris(2,4-di -t-butylphenyl) phosphite, 4,4'-methylene bis (2-6-di-t-butylphenol), 2,6-di-t-butyldimethylaminomethylphenol and blends thereof.

7. A polyurethane produced by reacting the polyisocyanate of claim 6 and a polyol selected from the group consisting of polyester polyols and polyoxyalkylene polyether polyols.

8. A polyurethane produced by reacting said stabilized polyisocyanate of claim 6 a polyester diol, and a short chain diol extender.

9. A polyurethane produced by reacting an organic isocyanate, a polyol selected from the group consisting of polyester polyols and polyoxyalkylene polyether polyols, a short chain extender and stabilizer package comprising a stabilizer package system comprising 2,6-di-(t-butyl)-p-cresol and a compound selected from tris(nonylphenyl) phosphite, tetrakis(2,4-di-t-butyl-phenyl)-4,4'-biphenylene diphosphonite, bis(2,4-di-t-butylphenyl)pentaerythritol disphosphite, 2,2'-oxamido-bis-, distearyl thiodipropionate, triisodecyl phosphite, trilauryl trithiophosphite, distearyl pentaerythritol, 2,2'ethylene bis(4,6-di-tertiarybutylphenol), octadecyl 3-(3',5'-di-t-butyl-4'-hydroxyphenyl)propionate, 4,4'-thio-bis(2-t-butyl-5-methylphenol), 4,4'-thio-bis(2-t-butyl-5-methylphenol), 2,2'-methylene-bis-(4-methyl-6-t-butylphenol), tris (3,5-di-t- butyl-4-hydroxybenzyl) isocyanurate, phenothiazine, tris(2,4di-t-butyl-phenyl) phosphite, 4,4'-methylene bis (2,6-di-tbutyl-phenol), -2,6-di-t-butyldimethyl-aminomethylphenol and blends thereof.

* * * * *